(12) United States Patent
Nakamura

(10) Patent No.: US 8,204,679 B2
(45) Date of Patent: Jun. 19, 2012

(54) MOBILE APPARATUS, CONTROL DEVICE AND CONTROL PROGRAM

(75) Inventor: Makoto Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1112 days.

(21) Appl. No.: 12/062,026

(22) Filed: Apr. 3, 2008

(65) Prior Publication Data

US 2008/0249660 A1    Oct. 9, 2008

(30) Foreign Application Priority Data

Apr. 6, 2007   (JP) .................. 2007-099999

(51) Int. Cl.
*G05B 19/04* (2006.01)
*G06G 7/78* (2006.01)

(52) U.S. Cl. ............ 701/301; 700/253; 700/255; 901/1; 318/568.2

(58) Field of Classification Search ............ 701/253, 701/301
See application file for complete search history.

(56) References Cited

U.S. PATENT DOCUMENTS

| | | | | |
|---|---|---|---|---|
| 5,570,285 | A * | 10/1996 | Asaka et al. ........... | 701/23 |
| 6,173,215 | B1 * | 1/2001 | Sarangapani ........... | 700/255 |
| 6,721,659 | B2 * | 4/2004 | Stopczynski .......... | 701/301 |
| 7,243,026 | B2 * | 7/2007 | Kudo ..................... | 701/301 |
| 7,398,136 | B2 * | 7/2008 | Higaki et al. ........... | 700/255 |
| 7,571,026 | B2 * | 8/2009 | Nakamura et al. ...... | 700/251 |
| 7,818,090 | B2 * | 10/2010 | Okamoto ................ | 700/253 |
| 8,019,475 | B2 * | 9/2011 | Kuroda .................. | 700/255 |
| 8,041,457 | B2 * | 10/2011 | Ohno ..................... | 700/259 |
| 2008/0040040 | A1 * | 2/2008 | Goto et al. ............. | 701/301 |

FOREIGN PATENT DOCUMENTS

| | | |
|---|---|---|
| JP | 62-118282 | 5/1987 |
| JP | 02-188809 | 7/1990 |
| JP | 05-165523 | 7/1993 |
| JP | 07-325620 | 12/1995 |
| JP | 2005-339175 | 12/2005 |
| JP | 2006-035381 | 2/2006 |
| JP | 2006-236098 | 9/2006 |

* cited by examiner

*Primary Examiner* — Thomas G. Black
*Assistant Examiner* — Lin B Olsen
(74) *Attorney, Agent, or Firm* — Rankin, Hill & Clark LLP

(57) ABSTRACT

A mobile apparatus capable of moving while avoiding contact with an object by allowing the object to recognize the behavioral change of the mobile apparatus is provided. The robot and its behavioral state and the object and its behavioral state are recognized as a first spatial element and its behavioral state and a second spatial element and its behavioral state, respectively, in an element space. Based on the recognition result, if the first spatial element may contact the second spatial element in the element space, a shift path is set which is tilted from the previous target path by an angle responsive to the distance between the first spatial element and the second spatial element. With the end point of the shift path as a start point, a path allowing the first spatial element to avoid contact with an expanded second spatial element is set as a new target path.

16 Claims, 10 Drawing Sheets

MOBILE APPARATUS, CONTROL DEVICE AND CONTROL PROGRAM

BACKGROUND OF THE INVENTION

1. Field of the Invention

The present invention relates to an apparatus or the like which autonomously moves along a target path.

2. Description of the Related Art

As robots have become more sophisticated in functionality, there are increasing opportunities for the robots to perform jobs or works such as carrying luggage or guiding human beings to their destinations, and the need for the robots to move while preventing contact with the human beings is increasing. In this relation, a technique to issue a sign from a robot which can be visually or auditorily recognized by the human beings surrounding the robot to thereby inform them of the traveling direction of the robot has been proposed (see Japanese Patent Application Laid-Open No. 2006-035381). Further, a technique to retrieve a path within a range of path selection filter for preventing a robot from contacting an obstacle and, if there is no path within the range, to enlarge the range of the path selection filter in a stepwise manner to retrieve a new path, has been proposed (see Japanese Patent Application Laid-Open No. 2006-236098).

If the human beings surrounding the robot do not know the meanings of the signs issued from the robot, however, the behavior of the robot predicted by the human beings may differ from the actual behavior of the robot, thereby rather confusing the human beings. Further, if the change of the traveling direction of the robot is small, it will be difficult to cause the human beings surrounding the robot to expect that the robot will change the traveling direction. When a person moves his/her position based on false prediction or estimation, the possibility of contacting the robot may rather increase. In such a case, it will be difficult for the robot and the human beings surrounding it to move in a cooperative manner.

SUMMARY OF THE INVENTION

In view of the foregoing, an object of the present invention is to provide a mobile apparatus or the like capable of moving while avoiding contact with an object such as a human being, by allowing the object to more clearly recognize the behavioral change of the mobile apparatus.

A mobile apparatus according to a first aspect of the present invention is a mobile apparatus that autonomously moves along a target path as its operation is controlled by a control device, wherein the control device includes: a first processing element which recognizes the mobile apparatus and its behavioral state and an object and its behavioral state as a first spatial element and its behavioral state and a second spatial element and its behavioral state, respectively, in an element space; a second processing element which, based on a recognition result of the first processing element, recognizes whether there is presence/absence of a possibility of contact between the first spatial element and the second spatial element in the element space; and a third processing element which, based on the recognition result of the first processing element, sets a path that allows the first spatial element to prevent contact with the second spatial element in the element space as the target path, and, on the condition that the second processing element recognizes that there is the possibility of contact, sets a shift path that is tilted from the target path of a previous time by an angle responsive to a distance between the first spatial element and the second spatial element, and sets the target path of current time with an end point of the shift path as a start point of the target path of current time.

According to the mobile apparatus of the first aspect of the present invention, the path that allows the first spatial element to prevent contact with the second spatial element in the element space is set as the target path for the mobile apparatus in the real space. As used herein, the "spatial element" in the element space refers to the "point" for which its position, velocity, acceleration and other states in the element space can be defined, the "line segment" for which its shape, length and other states in addition to the position and the like in the element space can be defined, the "region" for which its shape, area and other states in addition to the position and the like in the element space can be defined, and the like. The "behavioral state" of the spatial element refers to the positional change of the spatial element over time, and more specifically refers to the current position, velocity, acceleration and others of the spatial element.

In the case where it is recognized that there is a possibility that the first spatial element may contact the second spatial element, i.e., in the case where the mobile apparatus may contact the object when it moves along the previously defined target path, a shift path is set. Then, with the end point of the shift path as a start point, a new (or, current) target path is set. Further, the operation of the mobile apparatus is controlled so that it moves along the shift path deviated from the previous target path, and then moves along the current target path. By causing the mobile apparatus to move along the shift path deviated from the previous target path, it is possible to allow the object such as a human being to recognize the behavior of the mobile apparatus, and thus, to prevent the undesirable situation of inducing an inappropriate behavior of the object from the standpoint of preventing contact therebetween.

Further, the shift path is tilted from the previous target path by an angle that is set in accordance with the distance between the first spatial element and the second spatial element. Accordingly, it is possible to change the traveling direction of the mobile apparatus as appropriate from the standpoint of causing the object such as a human being to clearly recognize or predict the behavior of the mobile apparatus, in consideration of the length of the distance between the mobile apparatus and the object. It is then possible to encourage the object to make an appropriate behavior based on the above recognition or prediction, for the purposes of preventing contact with the mobile apparatus, without causing the object to feel uncomfortable.

As used herein, that the component of the present invention "recognizes" the information means that the component performs every kind of information processing, such as searching a database for the information, reading the information from a storage device such as a memory, measuring, calculating and estimating the information based on the output signals of the sensors and the like, and storing the measured information and the like in a memory, which is necessary for the information to be prepared or ready for further information processing. Further, when a plurality of objects moves in an integrated manner, as in the case where an object is attached to another object, the objects may collectively be recognized as the second spatial element.

A mobile apparatus according to a second aspect of the present invention is characterized in that, in the mobile apparatus of the first aspect of the present invention, the second processing element recognizes an expanded second spatial element which corresponds to the second spatial element expanded intermittently or continuously in response to its behavioral state based on the recognition result of the first processing element, and the third processing element sets a path that allows the first spatial element to prevent contact with the expanded second spatial element as the target path.

According to the mobile apparatus of the second aspect of the present invention, the spatial element obtained as a result of expanding the second spatial element based on the behavioral state of the second spatial element with respect to the first spatial element in the element space is recognized as the expanded second spatial element. Thus, the expanded second spatial element is recognized as a spatial element having a size or spatiality greater than that of the second spatial element. Further, a target path that allows the first spatial element to prevent contact with the expanded second spatial element is set. Thus, compared to the case where the target path that allows the first spatial element to prevent contact with the second spatial element or other spatial element smaller than the expanded second spatial element is set, a more appropriate target path can be set from the standpoint of more reliably preventing the mobile apparatus from contacting the object in consideration of the behavioral state of the object.

As described above, the requirement for setting a new target path is that there is a possibility of contact between the first spatial element and the second spatial element, where the second spatial element is smaller than the expanded second spatial element. Accordingly, compared to the case where the requirement for setting a new target path is that the first spatial element may possibly contact the expanded second spatial element or other spatial element greater in size than the second spatial element, the frequency of change of the target path, and hence, the frequency of behavioral change of the mobile apparatus such as a change of direction, is restricted. This reduces the possibility that the behavioral change of the mobile apparatus would induce the behavioral change of the object, thereby rather increasing the possibility of contact therebetween.

A mobile apparatus according to a third aspect of the present invention is characterized in that, in the mobile apparatus of the second aspect of the present invention, the third processing element resets the shift path on the condition that the shift path crosses the expanded second spatial element.

According to the mobile apparatus of the third aspect of the present invention, the shift path is set so as not to cross the expanded second spatial element. This allows the mobile apparatus to move along an appropriate path from the standpoint of more reliably preventing contact between the mobile apparatus and the object, in consideration of the behavioral states of the mobile apparatus and the object.

A mobile apparatus according to a fourth aspect of the present invention is characterized in that, in the mobile apparatus of the first aspect of the present invention, the third processing element sets a tilt angle of the shift path with respect to the target path to be greater as a distance between the first spatial element and the second spatial element in the element space is shorter, based on the recognition result of the first processing element.

According to the mobile apparatus of the fourth aspect of the present invention, in the case where there is a possibility of contact between the mobile apparatus and the object, it is possible to cause the mobile apparatus to move along the shift path that is appropriately deviated from the previous target path by taking into consideration that there is a more urgent need to prevent the contact as the distance therebetween is shorter. Accordingly, it is possible to allow the object such as a human being to clearly and readily recognize or predict the behavior of the mobile apparatus, and thus, to prevent the undesirable situation where an inappropriate behavior of the object is induced from the standpoint of preventing contact therebetween.

A mobile apparatus according to a fifth aspect of the present invention is characterized in that, in the mobile apparatus of the first aspect of the present invention, the first processing element recognizes shape and size of a region where the mobile apparatus is passable as shape and size of the element space, and the third processing element sets the target path and the shift path within the element space.

According to the mobile apparatus of the fifth aspect of the present invention, it is possible to cause the mobile apparatus to move within the extent of its passable region.

A mobile apparatus according to a sixth aspect of the present invention is characterized in that, in the mobile apparatus of the first aspect of the present invention, the third processing element sets the shift path to be longer as a relative velocity of the second spatial element with respect to the first spatial element in the element space is greater.

According to the mobile apparatus of the sixth aspect of the present invention, it is possible to move the mobile apparatus far from the previous target path when the relative velocity of the object to the mobile apparatus is great by taking into consideration that there is an urgent need to prevent the contact therebetween. This allows the object such as a human being to clearly and readily recognize or predict the behavior of the mobile apparatus, whereby the contact therebetween is surely prevented.

A mobile apparatus according to a seventh aspect of the present invention is characterized in that, in the mobile apparatus of the first aspect of the present invention, the mobile apparatus is a robot capable of moving by repeating a unit operation to exert a propulsive force on a floor surface, and the third processing element sets the shift path within a range where the robot is capable of moving with a predetermined number of the unit operations.

According to the mobile apparatus of the seventh aspect of the present invention, it is possible to cause the robot to move along the path deviated from the previous target path, without forcing the robot to perform excessive repetition of the unit operations.

A mobile apparatus according to an eighth aspect of the present invention is characterized in that, in the mobile apparatus of the first aspect of the present invention, on the condition that the second processing element determines that there is the possibility of contact between the first spatial element and the second spatial element, the third processing element sets a plurality of points in the element space in different directions from the first spatial element, and sets the shift path with one of the plurality of points as its end point.

According to the mobile apparatus of the eighth aspect of the present invention, a plurality of points are set in the element space as the candidates of the end point of the shift path, and one of the points is ultimately selected as the end point of the shift path. This allows an appropriate shift path to be set from the standpoint of causing the object such as a human being to clearly recognize the behavior of the mobile apparatus and surely preventing the contact between the mobile apparatus and the object.

A control device according to a ninth aspect of the present invention is a device for controlling an operation of a mobile apparatus autonomously moving along a target path, wherein the control device includes: a first processing element which recognizes the mobile apparatus and its behavioral state and an object and its behavioral state as a first spatial element and its behavioral state and a second spatial element and its behavioral state, respectively, in an element space; a second processing element which, based on a recognition result of the first processing element, recognizes whether there is presence/absence of a possibility of contact between the first spatial element and the second spatial element in the element space; and a third processing element which, based on the recognition result of the first processing element, sets a path that allows the first spatial element to prevent contact with the second spatial element in the element space as the target path, and, on the condition that the second processing element recognizes that there is the possibility of contact, sets a shift path that is tilted from the target path of a previous time by an angle responsive to a distance between the first spatial element and the second spatial element, and sets the target path of current time with an end point of the shift path as a start point of the target path of current time.

According to the control device of the ninth aspect of the present invention, it is possible to appropriately change the traveling direction of the mobile apparatus for the purposes of causing the object such as a human being to clearly recognize or predict the behavior of the mobile apparatus in consideration of the length of the distance between the mobile apparatus and the object. It is then possible to encourage the object to make an appropriate behavior based on the above recognition or prediction, for the purposes of preventing contact with the mobile apparatus, without causing the object to feel uncomfortable.

A control program according to a tenth aspect of the present invention is characterized in that it causes a computer mounted on a mobile apparatus that autonomously moves along a target path to function as the control device of the ninth aspect of the present invention.

According to the control program of the tenth aspect of the present invention, it is possible to cause the computer mounted on the mobile apparatus to function as the device that controls the behavior of the mobile apparatus as appropriate from the standpoint of causing the object such as a human being to clearly recognize or predict the behavior of the mobile apparatus in consideration of the length of the distance between the mobile apparatus and the object.

DESCRIPTION OF THE PREFERRED EMBODIMENTS

Figure 1:
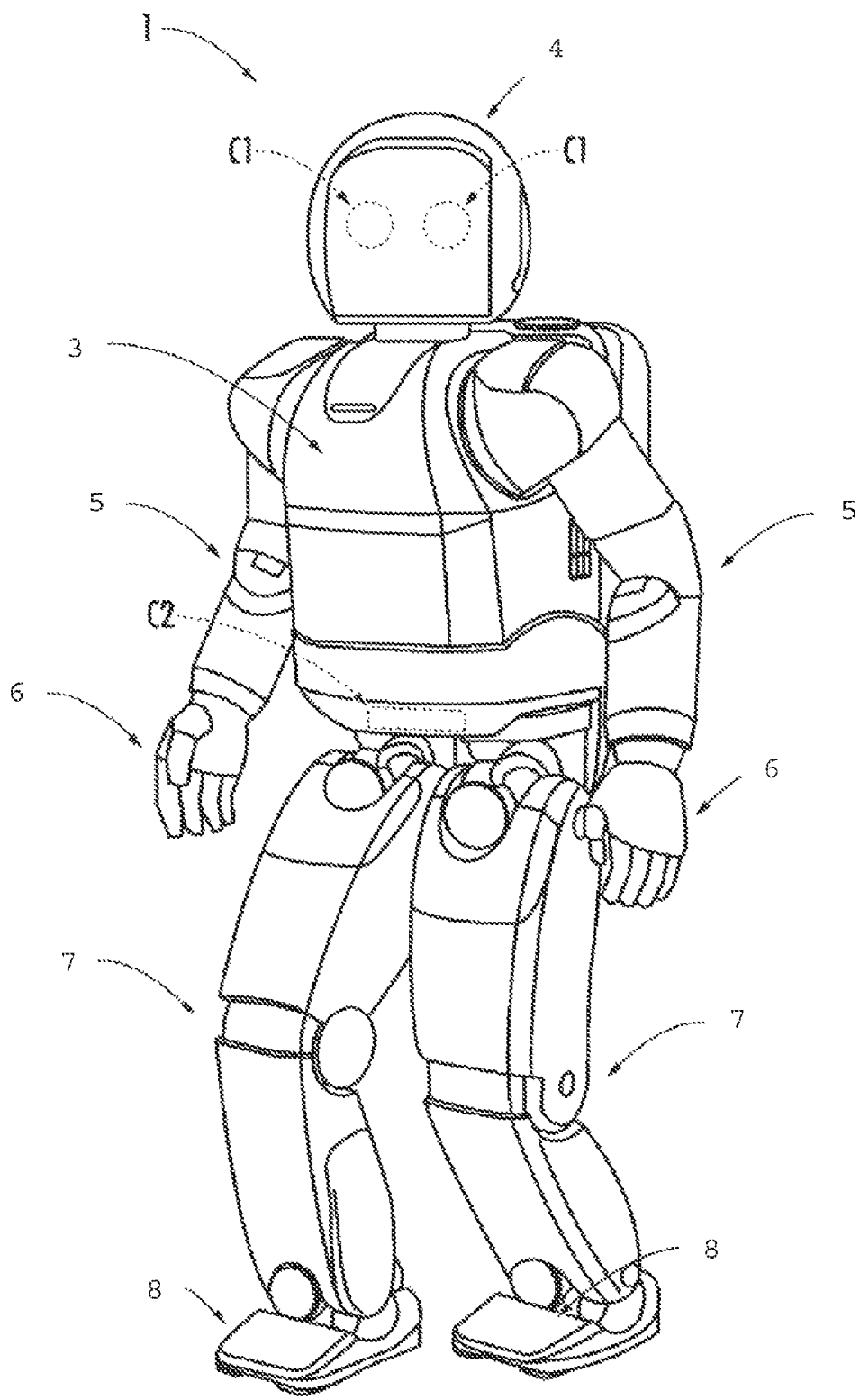
FIG. 1 illustrates the configuration of a mobile apparatus (robot) of the present invention.

Embodiments of a mobile apparatus and others of the present invention will now be described with reference to the drawings.

A robot 1 as a mobile apparatus includes: a body (trunk of the body) 3, a head 4 provided on top of the body 3, left and right arms 5 extended from the respective left and right sides of an upper part of the body 3, a hand 6 provided at an end of each of the arms 5, left and right legs 7 extended downward from a lower part of the body 3, and a foot 8 provided at an end of each of the legs 7. The robot 1 is capable of bending and stretching the arms 5 and the legs 7 at a plurality of joint portions corresponding to the joints of a human being, such as shoulder, elbow, carpal, hip, knee, and ankle joints, by the force transmitted from an actuator M (see FIG. 2), as disclosed in Japanese Re-Publications of PCT International Publications Nos. 03/090978 and 03/090979. The robot 1 can autonomously move with the left and right legs 7 (or feet 8) repeatedly taking off and landing on the floor. The height of the head 4 may be adjusted through adjustment of the tilt angle of the body 3 with respect to the vertical direction. The head 4 is mounted with a pair of head cameras (CCD cameras) $C_1$ arranged side by side to face forward of the robot 1. The body 3 is mounted with a waist camera (infrared camera) $C_2$ in front at the lower part. The robot 1 is mounted with various sensors S (see FIG. 2) which include a gyro sensor that outputs a signal responsive to the acceleration of the body 3, a rotary encoder that outputs a signal responsive to the joint angle of each joint, and a 6-axis force sensor that outputs a signal responsive to the floor reaction force acting on the legs 7.

The robot 1 includes a control device 10 which controls operations of the arms 5, legs 7 and others. The control device 10 is configured with an ECU or computer (constructed by CPU, ROM, RAM, I/O and others) serving as hardware and a "control program" of the present invention serving as software. While the control program may be prestored in a memory of the computer, it may be distributed or broadcast to the computer via a network or an artificial satellite by a server in response to a request signal transmitted from the robot 1 to the server, and then stored in the memory.

Figure 2:
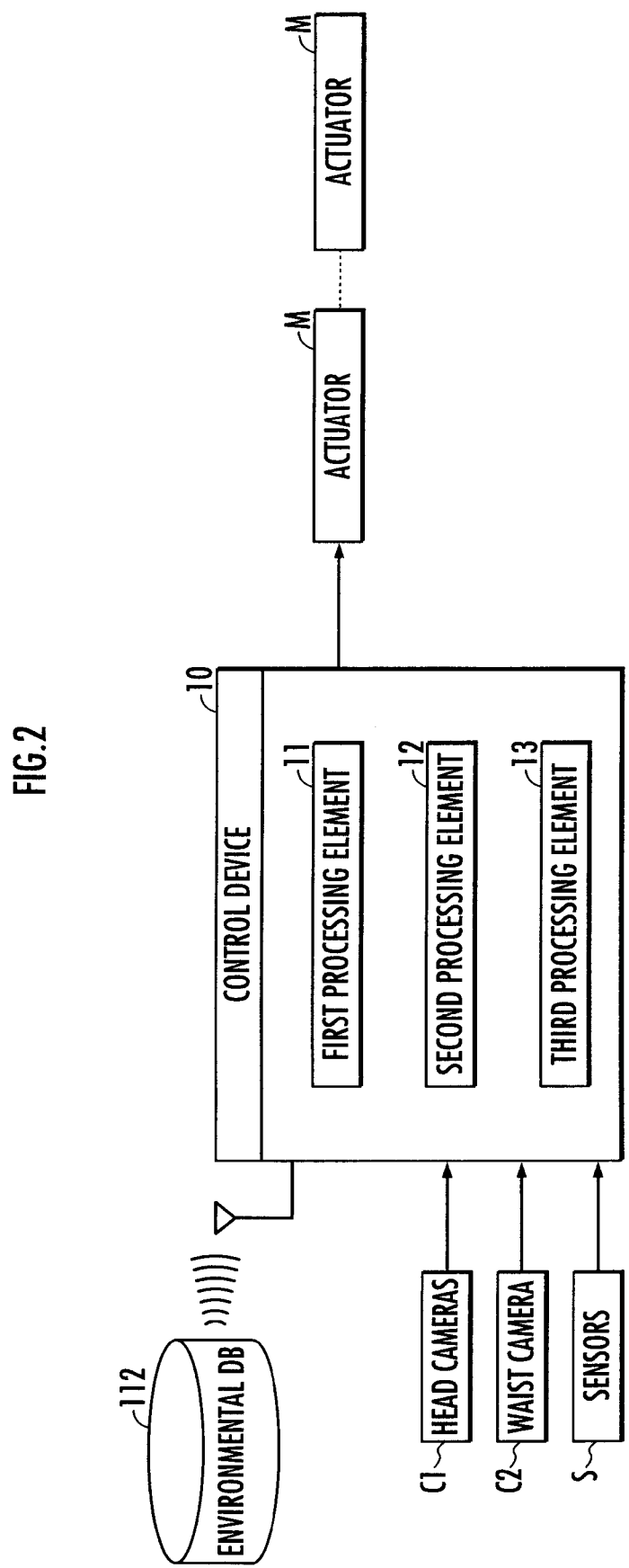
FIG. 2 illustrates the configuration of a control device of the present invention.

The control device 10 shown in FIG. 2 includes a first processing element 11, a second processing element 12, and a third processing element 13.

The first processing element 11 accesses an environmental database 112 via a radio system to recognize the passable region through which the robot 1 can travel or pass as an element space QS. The environmental database 112 manages data indicating the shape, area and others of the region where the robot 1 is passable. It is noted that the environmental database 112 may be mounted on the robot 1 as a part of the control device 10. Further, the first processing element 11 recognizes the robot 1 and its behavioral states, such as its position, velocity and the like, as a first spatial element $Q_1$ and its behavioral states in the element space QS, based on the output signals of the sensors S and the like. Furthermore, the first processing element 11 recognizes the object 2 and its behavioral states, such as its position, velocity and the like, as a second spatial element $Q_2$ and its behavioral states in the element space QS, based on the images of the surroundings of the robot 1 picked up by either or both of the head cameras $C_1$ and the waist camera $C_2$.

The second processing element 12 recognizes the second spatial element $Q_2$ expanded based on the recognition result of the first processing element 11 as an expanded second spatial element $EQ_2$. Further, the second processing element 12 recognizes whether there is presence/absence of a possibility of contact between the first spatial element $Q_1$ and the second spatial element $Q_2$ based on the recognition result of the first processing element 11.

The third processing element 13 sets a path that allows the first spatial element $Q_1$ to prevent contact with the expanded second spatial element $EQ_2$ in the element space QS as a target path $R_t$ that the robot 1 follows in the real space or in the passable region, based on the recognition results of the first processing element 11 and the second processing element 12.

Further, the third processing element 13 sets a shift path $r_{k+1}$ on the condition that the second processing element 12 recognizes that there is a possibility of contact between the first spatial element $Q_1$ and the second spatial element $Q_2$, and sets a new (or, current) target path $R_{k+1}$ with the end point of the shift path $r_{k+1}$ as the start point of the current target path $R_{k+1}$. The shift path $r_{k+1}$ is tilted from the previous target path $R_k$ by an angle θ responsive to the distance d between the first spatial element $Q_1$ and the second spatial element $Q_2$.

Figure 4:
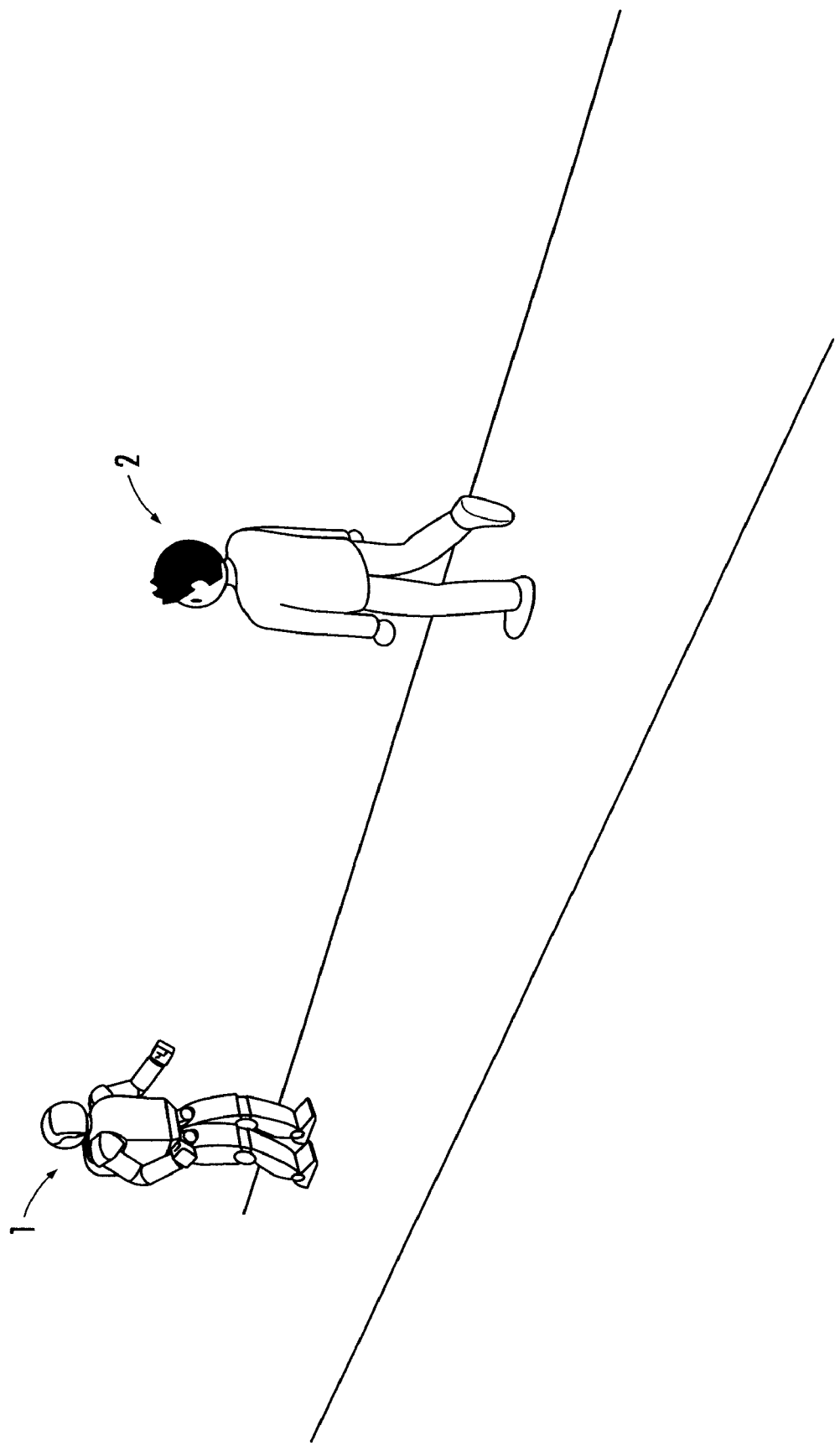
FIG. 4 illustrates a situation of a robot and an object.

Now, the functions of the robot having the above-described configuration will be described. The situation as shown in FIG. 4 is assumed in which the robot 1 and an object (human being) 2 are moving, while facing each other, in a corridor (passable region) delimited by the left and right walls. In this case, the robot 1 is walking or running along the target path $R_k$ indicated by a dashed line in FIG. 5, for example. The target path $R_k$ is preset in the initial state (k=0), and changed whenever necessary by the third processing element 13, as will be described later.

Figure 3:
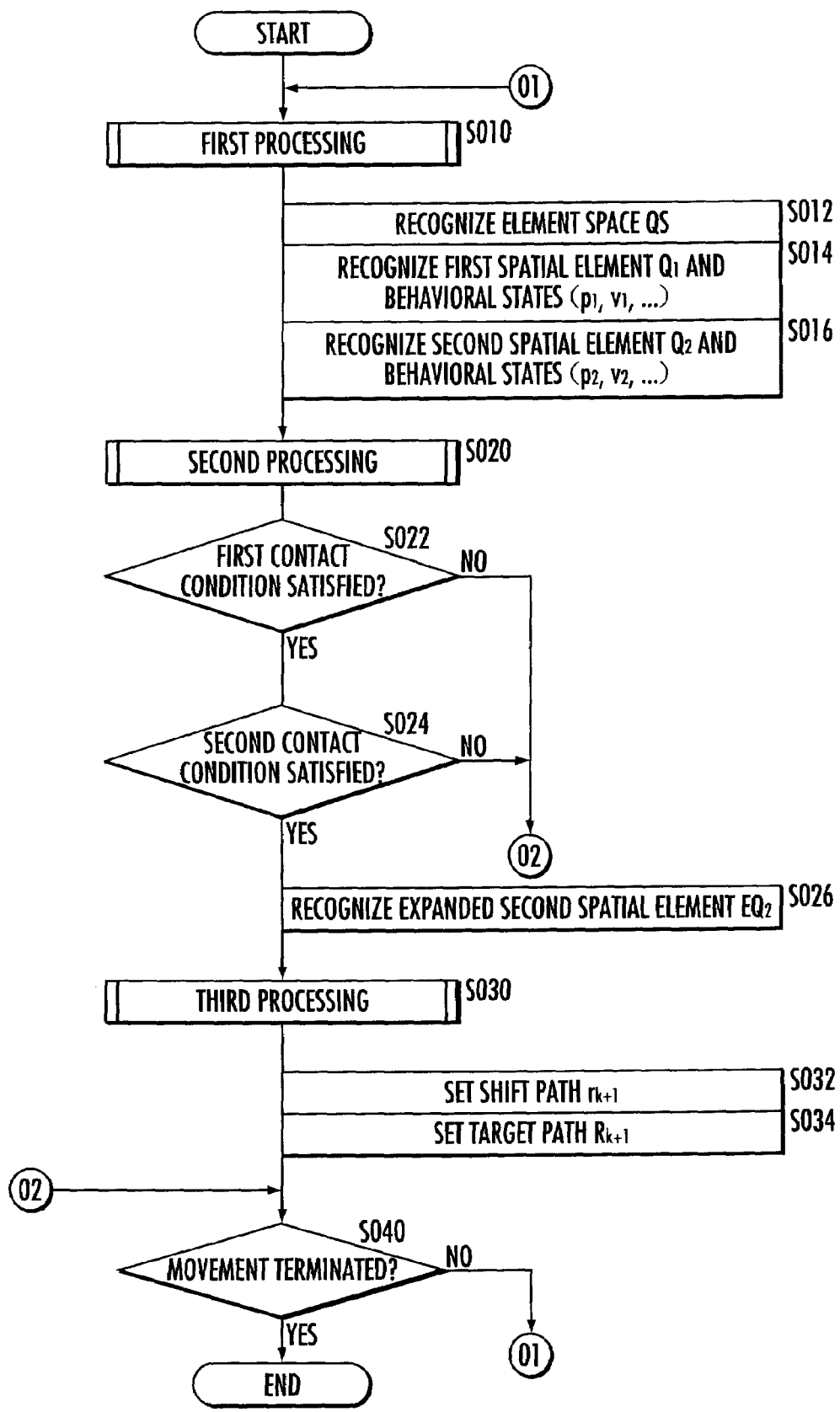
FIG. 3 is a flowchart illustrating a method of controlling a mobile apparatus of the present invention.
Figure 5:
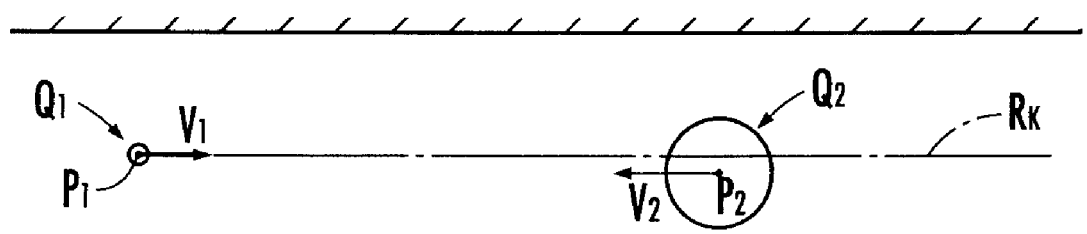
FIG. 5 illustrates a result of recognition of a first spatial element and a second spatial element.

Firstly, the first processing element 11 carries out "first processing" (S010 in FIG. 3). Specifically, the first processing element 11 accesses the environmental database 112 via a radio system to recognize the region where the robot 1 can pass as the element space QS (S012 in FIG. 3). In this manner, the element space QS in accordance with the shapes of the corridor and fixed structures as shown e.g. in FIG. 4, and having the shape and area as shown e.g. in FIG. 5, is recognized.

Further, the first processing element 11 recognizes the robot 1 and its behavioral states, such as its position, velocity and the like as the first spatial element $Q_1$ and its behavioral states in the element space QS, based on the output signals of the sensors S and the like (S014 in FIG. 3). The position of the robot 1 is measured based on the signals representing the latitude and longitude obtained by its GPS function, or the signals representing the acceleration of the robot 1 sequentially output from the gyro sensor. The velocity of the robot 1 may be measured based on the positions of the robot 1 measured in time series, the output signals from the gyro sensor, or the output signals from the rotary encoder responsive to the joint angles of the legs 7, and the inverse dynamics model and the like. In this manner, the robot 1 and its position and velocity in the global coordinate system are recognized as the first spatial element (small circular region) $Q_1$, the first position (center of the small circular region) $p_1$ and the first velocity $v_1$, respectively, in the element space QS as shown e.g. in FIG. 5. Furthermore, the first processing element 11 recognizes the object 2 and its behavioral states, such as its position, velocity and the like, as the second spatial element $Q_2$ and its behavioral states in the element space QS, based on the images of the surroundings of the robot 1 picked up by either or both of the head cameras $C_1$ and the waist camera $C_2$ (S016 in FIG. 3). Since the position of the object 2 in the robot coordinate system measured based on the images obtained by the head cameras $C_1$ and/or the waist camera $C_2$ corresponds to the relative position of the object 2 with respect to the robot 1, it is converted to the position in the global coordinate system based on the position of the robot 1 in the global coordinate system. In this manner, the object 2 and its position and velocity in the global coordinate system are recognized as the second spatial element (circular region) $Q_2$, the second position $p_2$ and the second velocity $v_2$, respectively, in the element space QS as shown e.g. in FIG. 5.

The shape and size of the first spatial element $Q_1$ in the element space QS may be recognized by reading them from a memory (where the shape and size of the robot 1 are stored). The shape and size of the second spatial element $Q_2$ in the element space QS may be recognized, after the type of the object 2 is recognized based on the images of the surroundings of the robot 1 obtained by the head cameras $C_1$ and the like, by referring to the memory or database (where the types, shapes and sizes of the objects are associated with each other and stored or managed) based on the recognition result. Further, the position of the object 2 may be measured or recognized, when signals representing the latitude and longitude of the object 2 are received from a communication device or the like mounted on the object 2, based on these signals. Furthermore, the velocity of the object 2 may be measured as the change in position of the object 2 over time. While the element space QS may be defined as a flat surface or a curved surface on which a given point is specified by the latitude and longitude, it may be defined sequentially based on the shape of the floor surface around the robot 1, such as its tilt angle, presence/absence of steps or irregularities, recognized from the images obtained by the head cameras $C_1$ and the like.

In the case where a box, an instrument, or other object is moving with the robot 1 in an integrated manner, for example when the robot 1 is carrying the box with its arms 5 or when the optional instrument is attached to the body 3 to provide the robot 1 with an additional function, the shapes and sizes of the robot 1 and the object that are moving together may be recognized as the shape and size of the robot 1.

Figure 6:
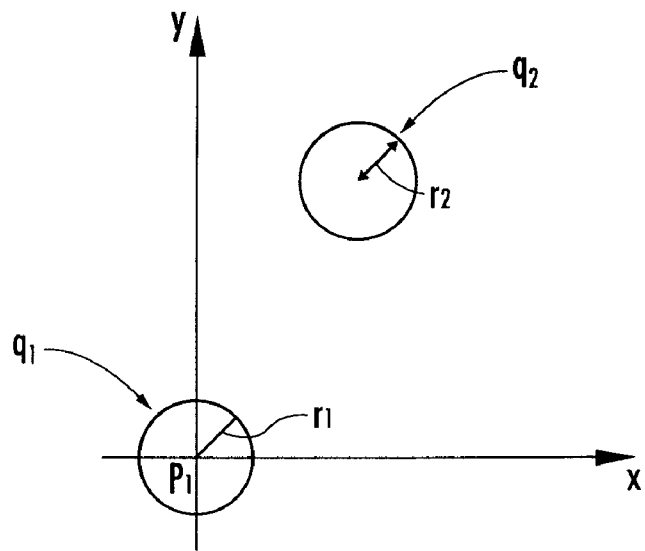
FIG. 6 illustrates a method of recognizing a second spatial element.
Figure 6:
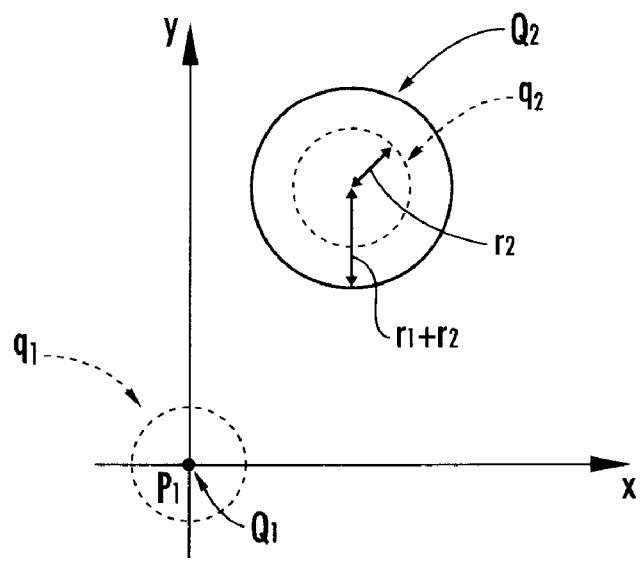

The region corresponding to the geometric characteristics (shape and size) of the object 2 in the element space and expanded in response to the geometric characteristics of the robot 1 is recognized as the second spatial element $Q_2$. Here, the Minkowski sum of the two regions having the geometric characteristics in the element space QS corresponding to the geometric characteristics of the robot 1 and the object 2 is recognized as the second spatial element $Q_2$. In the case where the robot 1 and the object 2 are defined as a first region $q_1$ of a circular shape having a radius $r_1$ and a second region $q_2$ of a circular shape having a radius $r_2$, respectively, as shown in FIG. 6(a), the Minkowski sum of these two regions, $q_1+q_2$, represented as a circular region as shown in FIG. 6(b), is recognized as the second spatial element $Q_2$. When the first region $q_1$ is moved around the second region $q_2$ in such a manner that the center of the first region $q_1$ follows the contour of the second region $q_2$, the sum of the second region $q_2$ and the ring-shaped region of the first region $q_1$ running off the edge of the second region $q_2$ corresponds to the Minkowski sum (=the circular region having the radius $r_1+r_2$). The shape and size of the first region $q_1$ are prestored in the memory in response to the size (or the shape and size) of the robot 1, and recognized by reading them from the memory. The second region $q_2$ is recognized as the region having the spatiality corresponding to the size (or the shape and size) of the object 2 recognized from the images obtained by the head cameras $C_1$ and the like. Alternatively, the second region $q_2$ as it is may be recognized as the second spatial element $Q_2$, or the second region $q_2$ expanded in accordance with the size or other geometric characteristics of the first region $q_1$ using a method other than the Minkowski sum may be recognized as the second spatial element $Q_2$.

The second processing element 12 carries out "second processing" (S020 in FIG. 3). Specifically, the second processing element 12 determines whether the second spatial element $Q_2$ satisfies a "first contact condition" regarding the movement cost from the first spatial element $Q_1$ in the element space QS (S022 in FIG. 3).

The movement cost is evaluated by the second processing element 12 as a function of one or both of the required time for and the moving distance of the first spatial element $Q_1$ until it comes into contact with the second spatial element $Q_2$ in the element space QS. Specifically, the distance in a straight line or the distance d along the target path (dashed line) $R_k$ between the first spatial element $Q_1$ and the second spatial element $Q_2$, the time $t=(d/|v_2-v_1|)$ required for the first spatial element $Q_1$ to contact the second spatial element $Q_2$ with the first spatial element $Q_1$ and the second spatial element $Q_2$ moving while maintaining the first velocity $v_1$ and the second velocity $v_2$, respectively, shown in FIG. 5, or an increasing function of one or both of the above-described distance d and the required time t, is evaluated as the movement cost. For example, the first contact condition that "the movement cost falls within the prescribed range of $\{0, \epsilon_+(>0)\}$" is adopted.

Further, if the second processing element 12 determines that the second spatial element $Q_2$ satisfies the first contact condition (YES in S022 in FIG. 3), it determines whether the second spatial element $Q_2$ satisfies a "second contact condition" regarding the positional relationship with the target path $R_k$ (S024 in FIG. 3). For example, assuming the case where the second contact condition that "there is an intersection point or a contact point with the target path $R_k$" has been adopted, in the situation shown in FIG. 5, the second spatial element $Q_2$ intersects the target path $R_k$ of the robot 1, and thus, it is determined that the second contact condition is satisfied. Alternatively, the following may be adopted as the second contact condition: "that the accumulation or integration along a part or a whole of the shortest distance to the second spatial element $Q_2$ or the target path $R_k$ thereof is not greater than a predetermined value", "that there is an intersection point or a contact point between the tangent line of the target path $R_k$ at the first position $p_1$ (extending in the traveling direction of the first spatial element $Q_1$) and the second spatial element $Q_2$", or the like.

Figure 7:
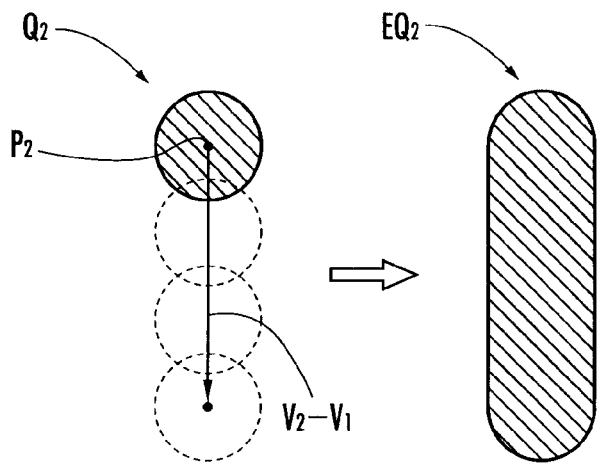
FIG. 7 illustrates a method of recognizing an expanded second spatial element.
Figure 7:
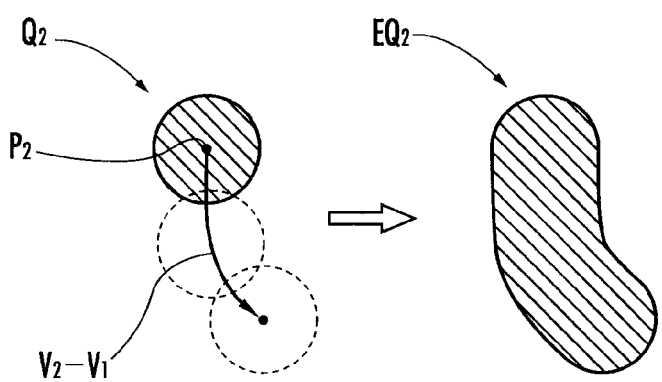
Figure 7:
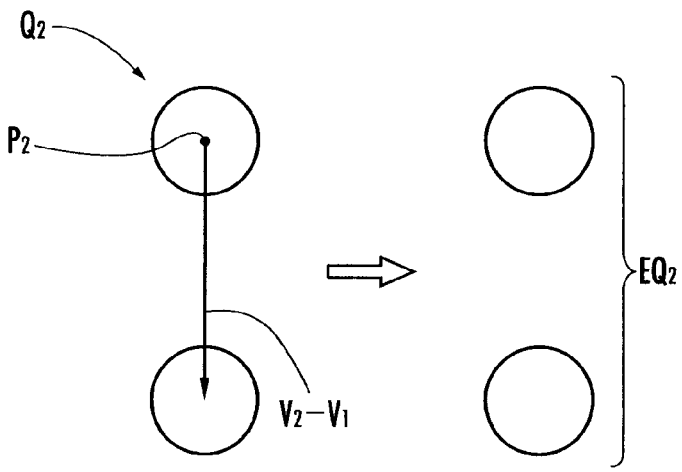

If the second processing element 12 determines that the second spatial element $Q_2$ satisfies the second contact condition in addition to the first contact condition (YES in S024 in FIG. 3), it recognizes the second spatial element $Q_2$ expanded based on the recognition result of the first processing element 11 as an expanded second spatial element $EQ_2$ (S026 in FIG. 3). For example, when the second spatial element $Q_2$ shown on the left in FIG. 7(a) is continuously enlarged in the direction corresponding to the relative velocity (vector), $v_2-v_1$, of the second velocity $v_2$ with respect to the first velocity $v_1$, the resultant, approximately straight band-shaped region shown on the right in FIG. 7(a) is recognized as the expanded second spatial element $EQ_2$. How much the second spatial element $Q_2$ is to be enlarged is set in accordance with the following expression (1), based on the second velocity $v_2$ of the second spatial element $Q_2$, the second position $p_2$ (or the relative second position $p_2-p_1$ with respect to the first position $p_1$), and the relative velocity $v_2-v_1$.

(Enlarged Amount)$=|p_2|\cdot|v_2|/|v_2-v_1|$ (1)

Figure 8:
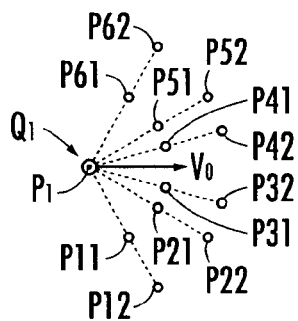
FIG. 8 illustrates a method of finding a shift path.
Figure 8:
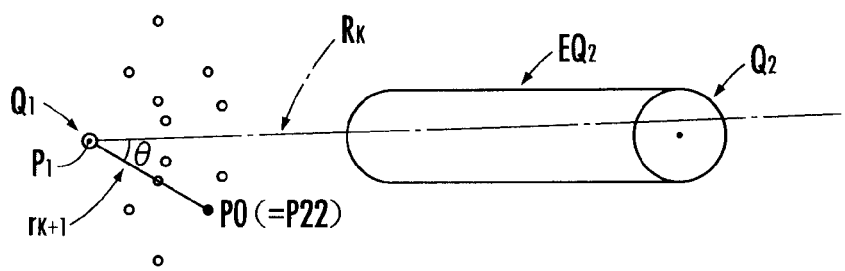
Figure 8:
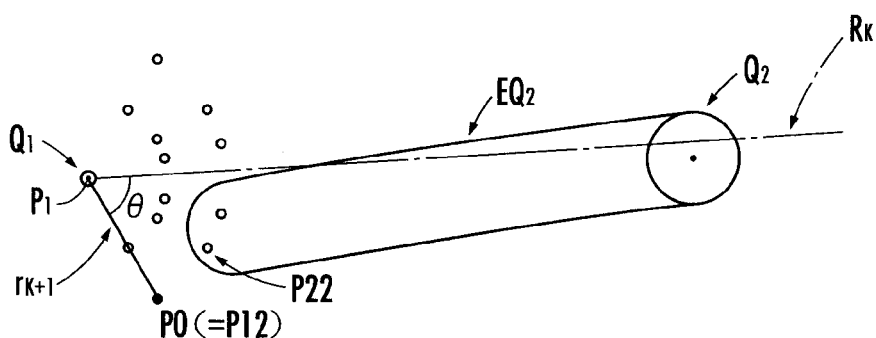
Figure 8:
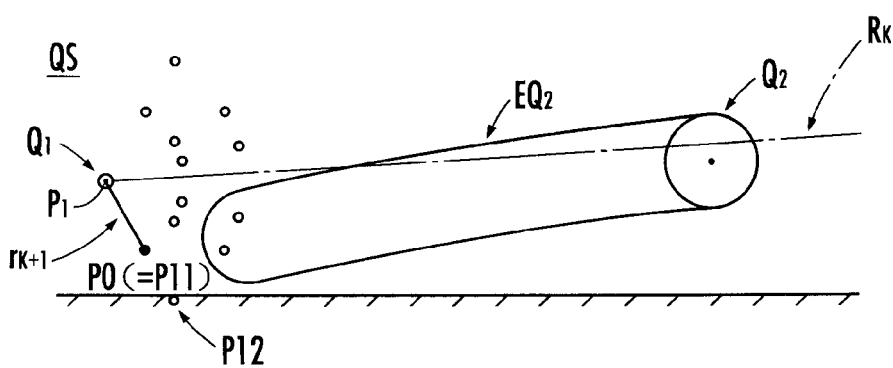

Alternatively, when the second spatial element $Q_2$ shown on the left in FIG. 7(b) is continuously enlarged so as to turn around in accordance with the relative velocity $v_2-v_1$, the resultant, bent band-shaped region shown on the right in FIG. 7(b) is recognized as the expanded second spatial element $EQ_2$. In the above-described situation shown in FIG. 5, the expanded second spatial element $EQ_2$ as shown in FIG. 8(b) is recognized. Still alternatively, the second spatial element $Q_2$ shown on the left in FIG. 7(c) may be intermittently enlarged in the direction corresponding to the relative velocity $v_2-v_1$, and the resultant, discrete spatial elements shown on the right in FIG. 7(c) may be recognized as the expanded second spatial element $EQ_2$.

If it is determined that the first or second contact condition is not satisfied (NO in S022 and S024 in FIG. 3), it is determined whether the robot 1 terminates its movement (S040 in FIG. 3), as will be described later.

Further, the third processing element 13 carries out "third processing" based on the recognition results of the first processing element 11 and the second processing element 12 (S030 in FIG. 3). Specifically, the third processing element 13 sets a line segment that is tilted from the previous target path $R_k$ in the element space QS as a shift path $r_{k+1}$ (S032 in FIG. 3).

For example, for each of the line segments (broken lines) extending in six directions from the first spatial element $Q_1$ in the element space QS as shown in FIG. 8(a), an intermediate point $p_{j1}$ (j=1 to 6) and an end point $p_{j2}$ are set. The distances from the first spatial element $Q_1$ to the intermediate points $p_{j1}$ and the end points $p_{j2}$ of the line segments are each set such that the robot 1 is capable of reaching in two to five steps, for example. Then, of the points $p_{21}$ and $p_{22}$ on the line segment tilted by $\theta$ from the previous target path $R_k$ as shown in FIG. 8(b), the point $p_{22}$ farthest from the first spatial element $Q_1$ is selected as an end point $p_0$ of the shift path $r_{k+1}$. The tilt angle $\theta$ is a function of the distance d between the first spatial element $Q_1$ and the second spatial element $Q_2$, and is set to be greater as the distance d is shorter, as shown in FIGS. 9(a) to (c).

In the case where the primarily selected point $p_{22}$ is included in the expanded second spatial element $EQ_2$ as shown in FIG. 8(c), however, of the points $p_{11}$ and $p_{12}$ on the line segment having a greater tilt angle $\theta$ with respect to the previous target path $R_k$, the point $p_{12}$ farthest from the first spatial element $Q_1$ is selected as the end point $p_0$ of the shift path $r_{k+1}$. Further, in the case where the secondarily selected point $p_{12}$ is out of the element space QS as shown in FIG. 8(d), of the points $p_{11}$ and $p_{12}$ on the same line segment, the point $p_{11}$ second to the farthest from the first spatial element $Q_1$ is selected as the end point $p_0$ of the shift path $r_{k+1}$. Then, the line segment connecting the first position $p_1$ and the selected point $p_0$ is set as the shift path $r_{k+1}$, as shown in each of FIGS. 8(b) to (d).

Further, the third processing element 13 sets the path having the end point $p_0$ of the shift path $r_{k+1}$ as its start point and allowing the first spatial element $Q_1$ to prevent contact with the expanded second spatial element $EQ_2$ (and hence the second spatial element $Q_2$) as a new (or, current) target path $R_{k+1}$ (S034 in FIG. 3). In this manner, the path avoiding contact with the expanded second spatial element $EQ_2$, as shown by a chain double-dashed line in each of FIGS. 9(a) to (c), for example, is set as the current target path $R_{k+1}$.

Furthermore, the current supplied to the actuators M is adjusted to cause the robot 1 to move along the shift path $r_{k+1}$ and the current target path $R_{k+1}$, whereby the operation of the robot 1 is controlled. Accordingly, in the case where the shift path $r_{k+1}$ and the current target path $R_{k+1}$ are set as shown in FIGS. 9(a) to (c), the robot 1 changes the traveling direction as illustrated in FIGS. 10(a) to (c), respectively, as seen from the front, to shift its position in the lateral direction.

It is then determined by the control device 10 whether the robot 1 terminates its movement (S040 in FIG. 3). For example, it is determined whether the distance $|p_d-p_1|$ between the first position $p_1$ and the target position $p_d$ of the first spatial element $Q_1$ in the element space QS has become not greater than a threshold value $\delta$. If the result of determination is negative (NO in S040 in FIG. 3), the first through third processing as described above are carried out repeatedly. If the result of determination is positive (YES in S040 in FIG. 3), the series of processing is completed.

According to the robot 1 exerting the above-described functions, a path that allows the first spatial element $Q_1$ to prevent contact with the expanded second spatial element $EQ_2$ (and hence the second spatial element $Q_2$) in the element space QS is set as the target path $R_k$ that the robot 1 will follow in the real space. If it is recognized that there is a possibility of contact between the first spatial element $Q_1$ and the second spatial element $Q_2$, i.e., if the robot 1 may contact the object 2 when it moves along the previously defined target path $R_k$, the shift path $r_{k+1}$ is set (S032 in FIG. 3, see FIGS. 8(a) to (d)). A new (or, current) target path $R_{k+1}$ is set with the end point $p_0$ of the shift path $r_{k+1}$ as its start point (S034 in FIG. 3, see FIGS. 9(a) to (c)). The operation of the robot 1 is controlled such that it moves along the shift path $r_{k+1}$ deviated from the previous target path $R_k$ and then moves along the current target path $R_{k+1}$ (see FIGS. 10(a) to (c)). Causing the robot 1 to move along the shift path $r_{k+1}$ deviated from the previous target path $R_k$ makes it possible to allow the object 2 such as a human being to recognize the behavior of the robot 1, and accordingly, it is possible to prevent the undesirable situation where an inappropriate behavior of the object 2 is induced from the standpoint of preventing contact therebetween.

Further, the shift path $r_{k+1}$ is tilted from the previous target path $R_k$ by the angle θ set in accordance with the distance d between the first spatial element $Q_1$ and the second spatial element $Q_2$ (see FIGS. 9(a) to (c)). Accordingly, it is possible to change the traveling direction of the robot 1 as appropriate from the standpoint of causing the object 2 such as a human being to clearly recognize or predict the behavior of the robot 1 in consideration of the length of the distance d between the robot 1 and the object 2 (see FIGS. 10(a) to (c)). More specifically, in the case where there is a possibility of contact between the robot 1 and the object 2, it is possible to cause the robot 1 to move along the shift path $r_{k+1}$ that is appropriately deviated from the previous target path $R_k$ by taking into consideration that there is a more urgent need to prevent the contact as the distance therebetween is shorter. This allows the object 2 such as a human being to clearly and readily recognize or predict the behavior of the robot 1, and thus prevents the undesirable situation where an inappropriate behavior of the object is induced from the standpoint of preventing the contact therebetween. Further, it is possible to encourage the object 2 to make an appropriate behavior for preventing contact with the robot 1, based on the above recognition or prediction, without causing the object 2 to feel uncomfortable.

The shift path $r_{k+1}$ is set so as not to cross the expanded second spatial element $EQ_2$ (see FIG. 8(c)). It is thus possible to cause the robot 1 to move along an appropriate path from the standpoint of more reliably preventing contact between the robot 1 and the object 2, in consideration of their behavioral states. Further, the shift path $r_{k+1}$ is set so as not to run off the element space QS (see FIG. 8(d)). It is thus possible to cause the robot 1 to move within the extent of its passable region.

While the robot 1 is capable of moving by repeating a unit operation of moving by one step to exert a propulsive force on the floor surface, the shift path $r_{k+1}$ is set within a range the robot 1 is capable of moving in a predetermined number of steps. Accordingly, it is possible to cause the robot 1 to move along the path $r_{k+1}$ deviated from the previous target path $R_k$, without forcing the robot 1 to perform excessive repetition of the unit operations.

Further, the second spatial element $Q_2$ expanded based on the behavioral states of the first spatial element $Q_1$ and the second spatial element $Q_2$ in the element space QS is recognized as the expanded second spatial element $EQ_2$ (see FIGS. 7(a) to (c)). The behavioral state of the second spatial element $Q_2$ is specified according to a part or all of the position, velocity, acceleration and the like that change over time. This allows the expanded second spatial element $EQ_2$ to be recognized as a spatial element greater in size or spatiality than the second spatial element $Q_2$.

Furthermore, the target path $R_{k+1}$ that allows the first spatial element $Q_1$ to prevent contact with the expanded second spatial element $EQ_2$ is set (see FIGS. 9(a) to (c)). Thus, compared to the case where the target path that can prevent the first spatial element $Q_1$ from contacting the second spatial element $Q_2$ or other spatial element smaller than the expanded second spatial element $EQ_2$ is set, a more appropriate target path $R_{k+1}$ is set from the standpoint of more reliably preventing the robot 1 from contacting the object 2 in consideration of the behavioral state of the object 2.

In the element space QS, the second spatial element $Q_2$ is recognized as the spatial element smaller in size or spatiality than the expanded second spatial element $EQ_2$, and the requirement for setting a new target path $R_{k+1}$ is that there is a possibility that the first spatial element $Q_1$ may contact the second spatial element $Q_2$ (see S022, S024 and S030 in FIG. 3). Therefore, compared to the case where the requirement for setting a new target path $R_{k+1}$ is that there is a possibility that the first spatial element $Q_1$ may contact the expanded second spatial element $EQ_2$ or other spatial element having the size greater than that of the second spatial element $Q_2$, the frequency of change of the target path $R_k$, and hence, the frequency of behavioral change of the robot 1 such as a change of direction, is restricted. This reduces the possibility that the behavioral change of the robot 1 would induce the behavioral change of the object 2, which would rather increase the possibility of contact therebetween.

Further, the shape and size of the second spatial element $Q_2$ in the element space QS may be recognized by referring to the database or the like. This prevents the undesirable situation where the object 2 is recognized as the second spatial element $Q_2$ having spatiality in the element space too large in view of its actual size due to the limitation of measurement accuracy of the size (or the shape and size) of the object 2 by the head cameras $C_1$ and the like. The frequency of change of the target path $R_k$ and the frequency of change of the traveling direction of the robot 1 accompanying the change of the path are restricted. In other words, the undesirable situation where the target path $R_k$ of the robot 1 is changed frequently due to the limitation of recognition accuracy of the geometric characteristics of the object 2 through the head cameras $C_1$ and the like, is prevented. In the case where the lower limit of the prescribed range regarding the movement cost is set to a positive value instead of "0", the first contact condition is not satisfied if the movement cost is less than the lower limit, and the target path $R_k$ is not changed (see S022 in FIG. 3). This prevents the traveling direction of the robot 1 from being changed in the state where the behavioral change of the robot 1 may induce the behavioral change of the object 2 because the object 2 is near the robot 1, thereby rather increasing the possibility of contact therebetween.

Furthermore, the Minkowski sum $q_1+q_2$ of the two regions corresponding to the geometric characteristics of the robot 1 and the object 2, respectively, is recognized as the second spatial element $Q_2$ (see FIGS. 6(a) and (b)). Thus, the sizes and shapes of the robot 1 and the object 2 are collectively reflected to the size and shape of the second spatial element $Q_2$ in the element space. This enables simple representation of the first spatial element $Q_1$ as a point or a small region in the element space QS, and facilitates determination of presence/absence of the second spatial element $Q_2$ that may contact the first spatial element $Q_1$, with the determination accuracy improved or maintained.

It is noted that the above-described control method may be applied to any apparatus having a mobile function, such as a robot that moves with the operations of more than two legs, a wheeled mobile robot (automobile) and the like, besides the robot that moves with the operations of the pair of left and right legs 7 as in the robot 1.

Further, the third processing element 13 may set a longer shift path $r_{k+1}$ as the relative velocity $v_2-v_1$ of the second spatial element $Q_2$ with respect to the first spatial element $Q_1$ in the element space QS is greater. This allows the robot 1 to move far from the previous target path $R_k$ when the relative velocity of the object 2 to the robot 1 is great by taking into consideration that there is an urgent need to prevent contact therebetween. Accordingly, it is possible to allow the object 2 such as a human being to clearly and readily recognize or predict the behavior of the robot 1, and hence, to more reliably prevent contact therebetween.

Figure 9:
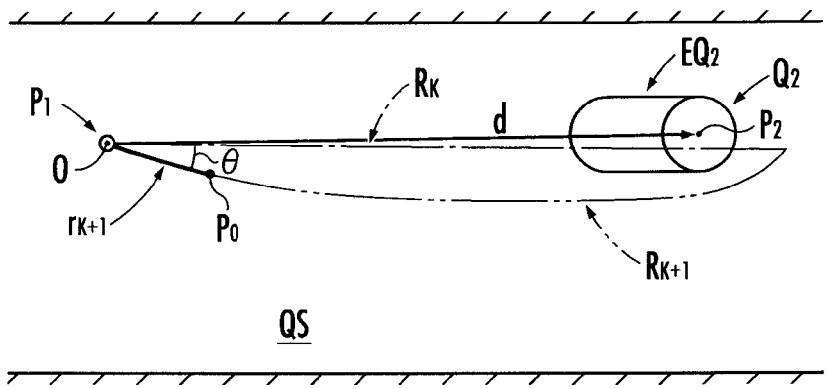
FIG. 9 illustrates a method of finding a new target path.
Figure 9:
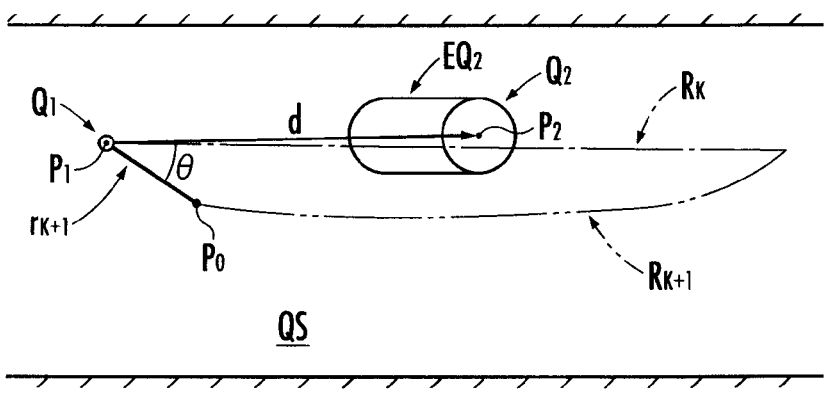
Figure 9:
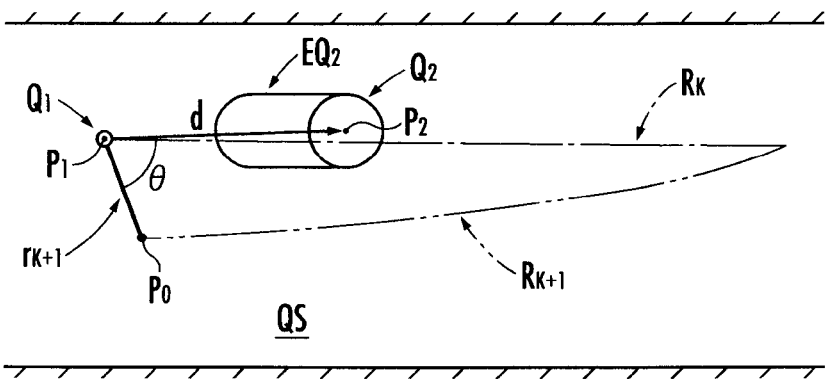
Figure 10:
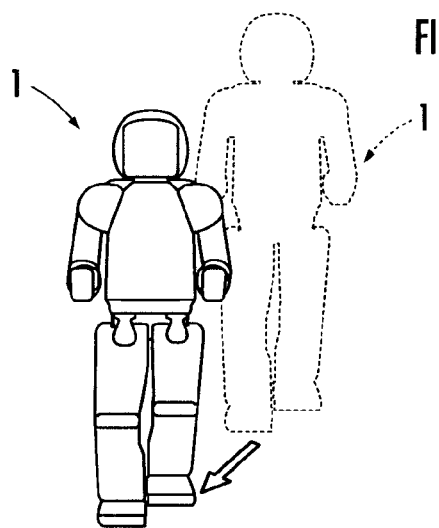
FIG. 10 illustrates how the robot moves.
Figure 10:
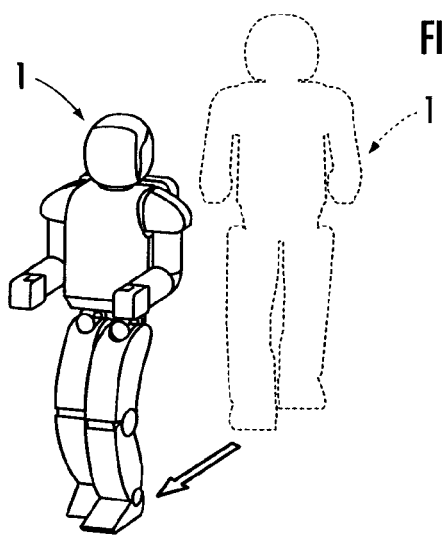
Figure 10:
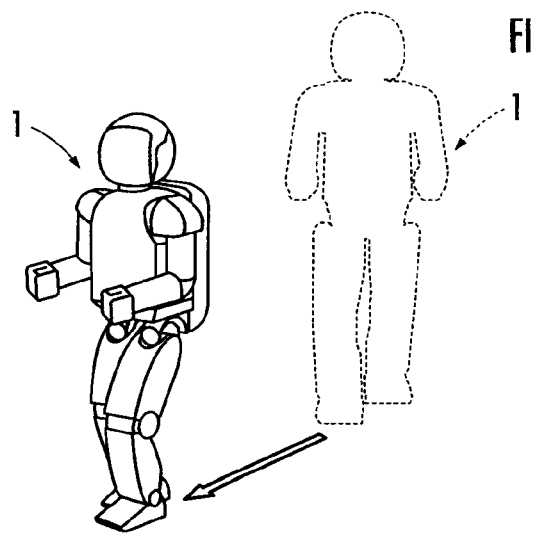

While the tilt angle θ of the shift path $r_{k+1}$ with respect to the previous target path $R_k$ is set to be greater as the distance d between the first spatial element $Q_1$ and the second spatial element $Q_2$ is shorter in the above-described embodiment (see FIGS. 9(*a*) to (*c*)), as another embodiment, the tilt angle θ of the shift path $r_{k+1}$ with respect to the previous target path $R_k$ may be set to be smaller as the distance d between the first spatial element $Q_1$ and the second spatial element $Q_2$ is shorter.

What is claimed is:

1. A mobile apparatus autonomously moving along a target path, comprising:
a control device, the control device including:
a first processing element which recognizes the mobile apparatus and its behavioral state and an object and its behavioral state, as a first spatial element and its behavioral state and a second spatial element and its behavioral state, respectively, in an element space;
a second processing element which, based on a recognition result of the first processing element, recognizes whether there is presence/absence of a possibility of contact between the first spatial element and the second spatial element in the element space; and
a third processing element which, based on the recognition result of the first processing element, sets a path that allows the first spatial element to prevent contact with the second spatial element in the element space as the target path, and, on a condition that the second processing element recognizes that there is the possibility of contact, sets a shift path that is tilted from the target path of a previous time by an angle responsive to a distance between the first spatial element and the second spatial element, and sets the target path of current time with an end point of the shift path as a start point of the target path of current time,
wherein
the second processing element recognizes an expanded second spatial element which corresponds to the second spatial element expanded intermittently or continuously in response to its behavioral state based on the recognition result of the first processing element, and
the third processing element sets a path that allows the first spatial element to prevent contact with the expanded second spatial element as the target path and resets the shift path on a condition that the shift path crosses the expanded second spatial element.

2. A mobile apparatus according to claim 1, wherein
the third processing element sets a tilt angle of the shift path with respect to the target path to be greater as a distance between the first spatial element and the second spatial element in the element space is shorter, based on the recognition result of the first processing element.

3. The mobile apparatus according to claim 1, wherein
the first processing element recognizes shape and size of a region where the mobile apparatus is passable, as shape and size of the element space, and
the third processing element sets the target path and the shift path within the element space.

4. The mobile apparatus according to claim 1, wherein
the third processing element sets the shift path to be longer as a relative velocity of the second spatial element with respect to the first spatial element in the element space is greater.

5. The mobile apparatus according to claim 1, wherein
on the condition that the second processing element determines that there is the possibility of contact between the first spatial element and the second spatial element, the third processing element sets a plurality of points in the element space in different directions from the first spatial element, and sets the shift path with one of the plurality of points as its end point.

6. A mobile apparatus autonomously moving along a target path, comprising:
a control device, the control device including:
a first processing element which recognizes the mobile apparatus and its behavioral state and an object and its behavioral state, as a first spatial element and its behavioral state and a second spatial element and its behavioral state, respectively, in an element space;
a second processing element which, based on a recognition result of the first processing element, recognizes whether there is presence/absence of a possibility of contact between the first spatial element and the second spatial element in the element space; and
a third processing element which, based on the recognition result of the first processing element, sets a path that allows the first spatial element to prevent contact with the second spatial element in the element space as the target path, and, on a condition that the second processing element recognizes that there is the possibility of contact, sets a shift path that is tilted from the target path of a previous time by an angle responsive to a distance between the first spatial element and the second spatial element, and sets the target path of current time with an end point of the shift path as a start point of the target path of current time,
wherein
the mobile apparatus is a robot capable of moving by repeating a unit operation to exert a propulsive force on a floor surface, and
the third processing element sets the shift path within a range where the robot is capable of moving with a predetermined number of the unit operations.

7. The mobile apparatus according to claim 6, wherein
on the condition that the second processing element determines that there is the possibility of contact between the first spatial element and the second spatial element, the third processing element sets a plurality of points in the element space in different directions from the first spatial element, and sets the shift path with one of the plurality of points as its end point.

8. The mobile apparatus according to claim 6, wherein
the third processing element sets a tilt angle of the shift path with respect to the target path to be greater as a distance between the first spatial element and the second spatial element in the element space is shorter, based on the recognition result of the first processing element.

9. The mobile apparatus according to claim 6, wherein
the first processing element recognizes shape and size of a region where the mobile apparatus is passable, as shape and size of the element space, and
the third processing element sets the target path and the shift path within the element space.

10. The mobile apparatus according to claim 6, wherein
the third processing element sets the shift path to be longer as a relative velocity of the second spatial element with respect to the first spatial element in the element space is greater.

11. A control device for controlling an operation of a mobile apparatus autonomously moving along a target path, the control device comprising:
a first processing element which recognizes the mobile apparatus and its behavioral state and an object and its behavioral state, as a first spatial element and its behavioral state and a second spatial element and its behavioral state, respectively, in an element space;
a second processing element which, based on a recognition result of the first processing element, recognizes whether there is presence/absence of a possibility of contact between the first spatial element and the second spatial element in the element space; and
a third processing element which, based on the recognition result of the first processing element, sets a path that allows the first spatial element to prevent contact with the second spatial element in the element space as the target path, and, on a condition that the second processing element recognizes that there is the possibility of contact, sets a shift path that is tilted from the target path of a previous time by an angle responsive to a distance between the first spatial element and the second spatial element, said shift path being longer as a relative velocity of the second spatial element with respect to the first spatial element in the element space is greater, and sets the target path of current time with an end point of the shift path as a start point of the target path of current time.

12. The control device according to claim 11, wherein
the third processing element sets a tilt angle of the shift path with respect to the target path to be greater as a distance between the first spatial element and the second spatial element in the element space is shorter, based on the recognition result of the first processing element.

13. The control device according to claim 11, wherein
the first processing element recognizes shape and size of a region where the mobile apparatus is passable, as shape and size of the element space, and
the third processing element sets the target path and the shift path within the element space.

14. The control device according to claim 11, wherein
the mobile apparatus is a robot capable of moving by repeating a unit operation to exert a propulsive force on a floor surface, and
the third processing element sets the shift path within a range where the robot is capable of moving with a predetermined number of the unit operations.

15. The control device according to claim 11, wherein
on the condition that the second processing element determines that there is the possibility of contact between the first spatial element and the second spatial element, the third processing element sets a plurality of points in the element space in different directions from the first spatial element, and sets the shift path with one of the plurality of points as its end point.

16. A control program stored on a non-transitory computer readable medium causing a computer mounted on a mobile apparatus autonomously moving along a target path to function as the control device as recited in claim 11.

* * * * *